P. POWERS.
POWER DRIVEN FARMING IMPLEMENT.
APPLICATION FILED AUG. 16, 1916.
1,247,450.
Patented Nov. 20, 1917.
4 SHEETS—SHEET 1.
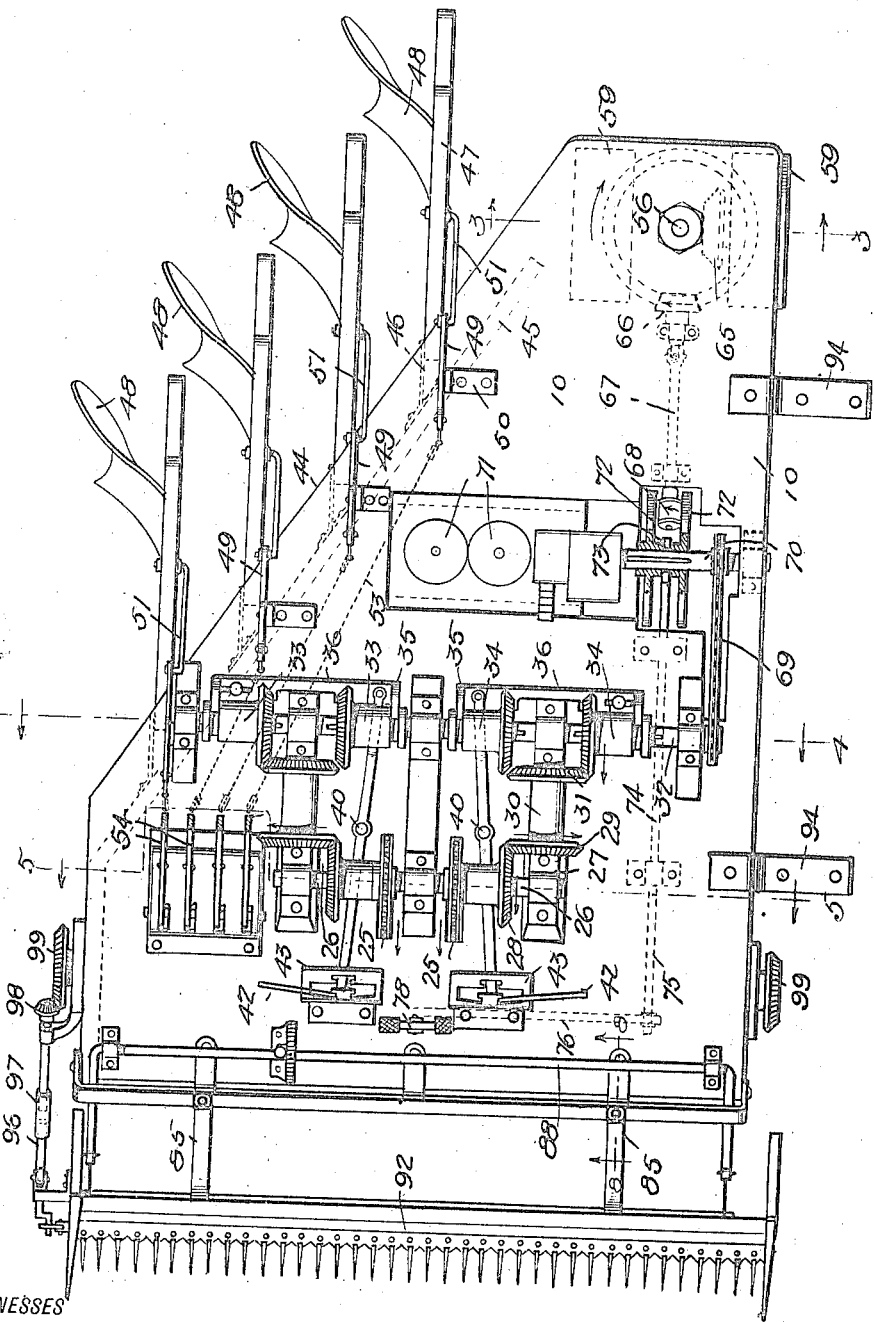
WITNESSES
J. E. Barry
Myron Clear
INVENTOR
Patrick Powers
BY
Munn & Co.
ATTORNEYS

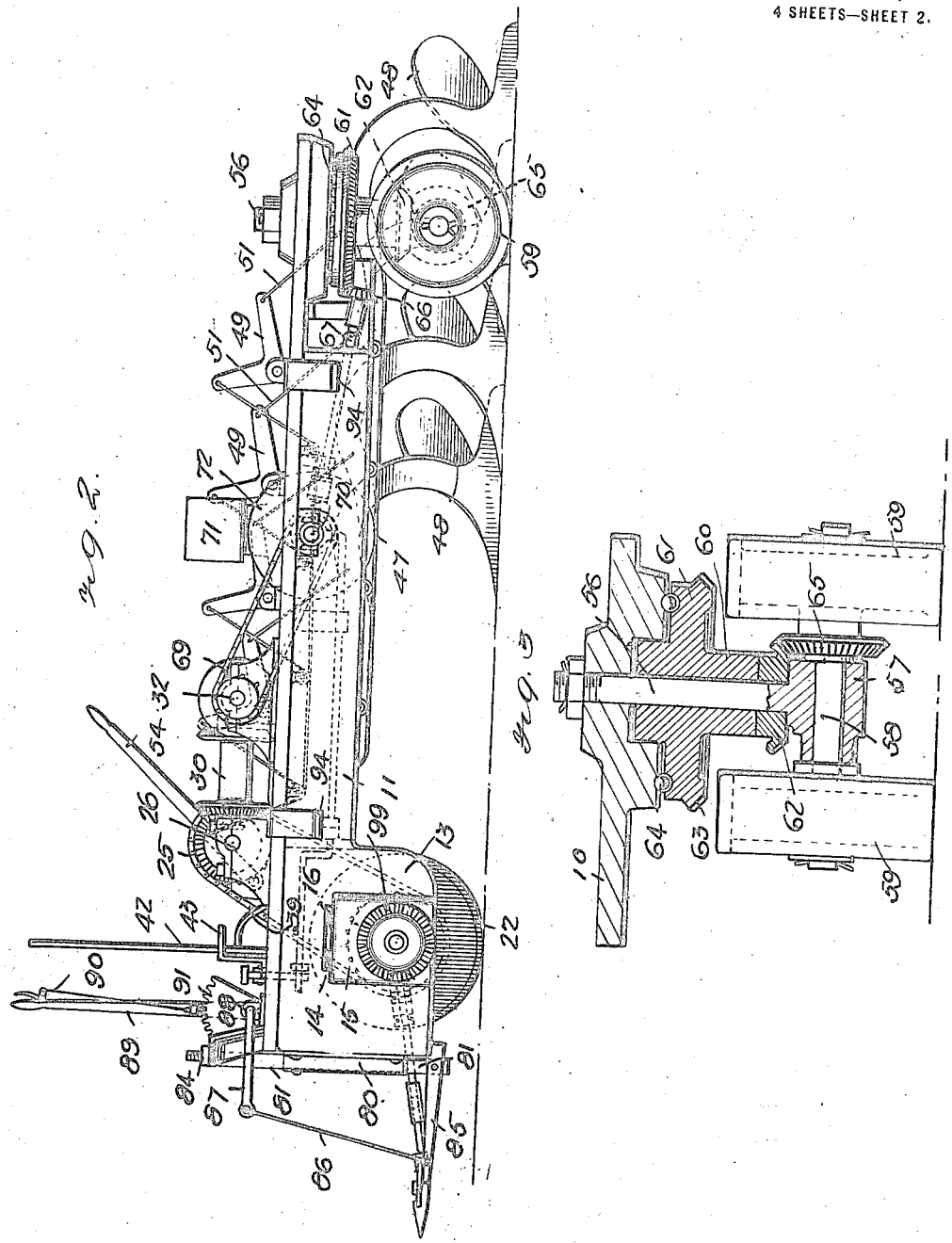

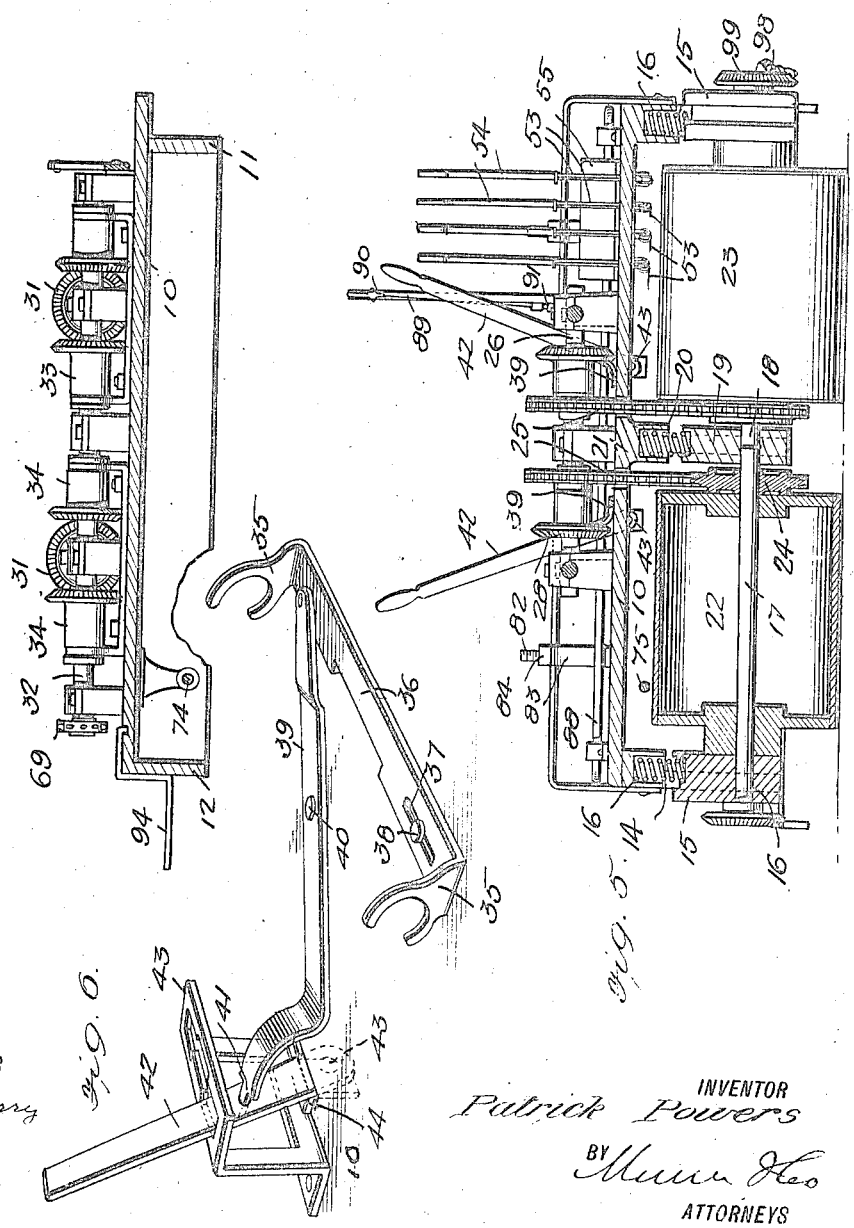

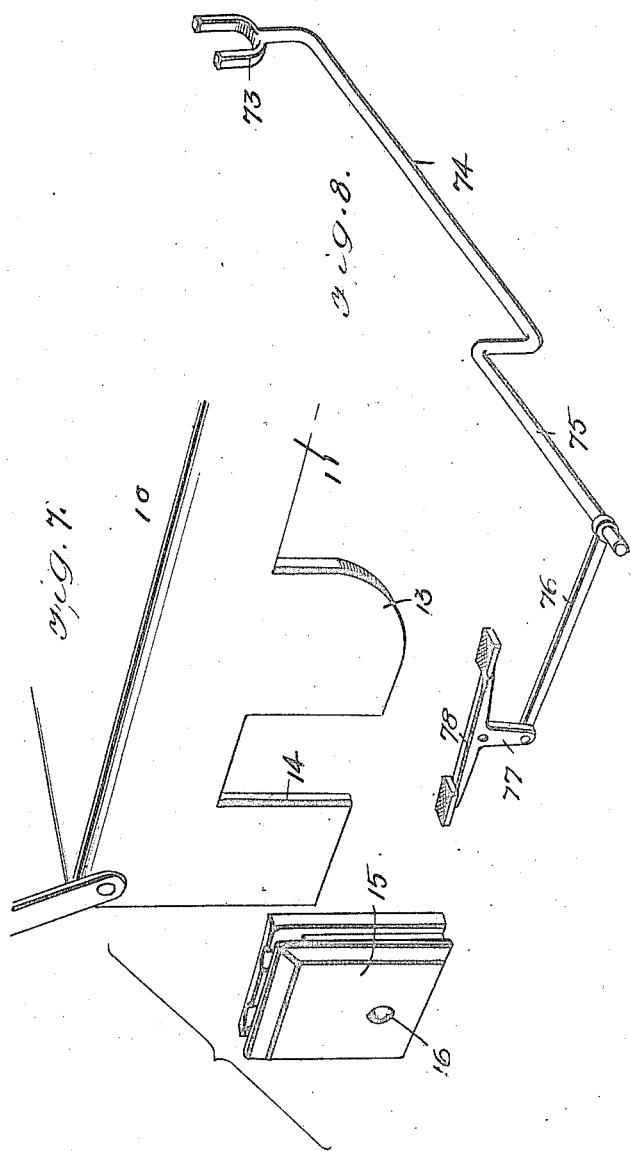

UNITED STATES PATENT OFFICE.

PATRICK POWERS, OF CAIRO, ILLINOIS.

POWER-DRIVEN FARMING IMPLEMENT.

1,247,450.

Specification of Letters Patent.    Patented Nov. 20, 1917.

Application filed August 16, 1916. Serial No. 115,206.

*To all whom it may concern:*

Be it known that I, PATRICK POWERS, a citizen of the United States, and a resident of Cairo, in the county of Alexander and State of Illinois, have invented a certain new and useful Improvement in Power-Driven Farming Implements, of which the following is a specification.

My present invention relates generally to power driven machines for farmers' use, my object being to provide a portable motor driven frame having means by which suitable soil treating and crop harvesting devices may be interchangeably attached thereto, and one of such nature capable of ready and easy control by the operator.

More specifically, my invention resides in the apparatus shown in the accompanying drawings, forming part of this specification, and to which reference is made in the following specification. The several figures of the drawings are as follows:

Figure 1 is a top plan view showing my improved machine;

Fig. 2 is a side elevation thereof;

Fig. 3 is a transverse vertical section taken through the extreme rear portion of the frame and through the steering caster, substantially on line 3—3 of Fig. 1;

Fig. 4 is a vertical transverse section taken substantially on line 4—4 of Fig. 1;

Fig. 5 is a similar view taken substantially on line 5—5 of Fig. 1;

Fig. 6 is a detail perspective view of one of the clutch controlling levers and its connection;

Fig. 7 is a detail perspective view of a portion of the forward end of the main frame, with one of the vertically adjustable bearings carried thereby;

Fig. 8 is a detail perspective view of the foot treadle and its controlling connections for the steering caster;

Referring now to these figures, it will be noted that the platform 10 constituting the frame of my improved machine, is provided with depending sides 11 and 12, the forward portions of which sides are extended downwardly at 13 and provided with rectangular cut out portions 14 in which are vertically adjustable a pair of bearing boxes 15, springs 16 being interposed between the upper ends of these boxes and the upper ends of the cut out portions 14 to normally hold the bearing boxes in lowermost position.

These bearing boxes are each provided with an aperture 16, said apertures receiving the outer ends of a pair of shafts 17 and 18 axially alined transversely of the forward portion of the main frame, the inner ends of each shaft being carried in the bearing boxes 19 and vertically adjustable against the tension of springs 20 in the rectangular aperture of an intermediate longitudinal rib 21 of the main frame, depending from the platform 10, as best seen in Fig. 5.

Mounted upon the shafts 17 and 18 are a pair of cylindrical rollers 22 and 23, each provided at its inner side with a sprocket wheel 24 connected by the sprocket chain 25 of a sprocket wheel mounted upon the inner end of its respective sprocket shaft 26. The chains 25 extend upwardly from slots in the platform 10 to the sprocket shafts 26, being mounted upon the upper surface of the platform 10 in bearings 27 and provided at their outer ends with bevel gears 28 meshing with bevel gears 29 mounted at the forward ends of countershafts journaled in bearings 30 and having bevel gears 31 at their rear ends.

Mounted transversely of and upon the platform 10 at the rear of the alined shafts 26 above mentioned, is a driven shaft 32 on which are splined opposing pairs of bevel gears 33 and 34, the gears of each pair being upon relatively opposite sides of and adapted for movement into contact with the gear 31 at the rear end of one of the counter shafts just above mentioned, the splined gears of each pair 33 and 34 being engaged by angular yokes 35 at the opposite ends of a laterally shiftable adjusting arm 36 guided in its movement by means of a slot 37 upwardly over a guide pin 38 projecting from the platform 10.

Each of the adjusting arms 36 is pivoted to the rear end of its respective adjusting lever 39 intermediately pivoted upon the platform 10 at 40, as best seen in Fig. 6, and provided with a forward reduced end 41 extending through an opening intermediate the ends of an operator's lever 42, the lower end of which is pivoted at 43 to an angle piece 44 secured to the platform 10.

Thus, each of the levers 42 controls the rotation and the direction of such rotation of one of the cylindrical rollers 22, 23, the splined gears of the pairs 33, 34 being shiftable, by actuation of the respective operator's lever 42, to engage either of its gears with the gears 31 or disengage its gear entirely from the gear 31.

Each of the operator's levers 42 is movable in a slotted bracket 43 upstanding from the platform 10, having cut out portions into which the lever may be moved to hold the same in adjusted position corresponding to engagement of either of the splined gears with the gear 31.

The inner rear side portion of the platform 10 is cut away at an angle, as best seen at 44 in Fig. 1, along which angular portion is extended a lower beam 45 carrying a plurality of brackets 46 to which the forward ends of a plurality of plow beams 47 are pivotally connected, these plow beams carrying plow shares 48 at their rear ends and being adjustable vertically by means of a series of bell crank levers 49 fulcrumed on rigid brackets 50 and connected to the plow beams 47 by connecting rods 51. The several bell crank levers 49 are also connected by flexible connections 53 with a series of levers 54 adjustable in the slotted casing 55. By manipulation of the several levers 54, the several plow beams 47 may be lowered and raised to and from operative position.

At the extreme rear end of the platform 10 and at its opposite side, the main frame is supported by a steering caster including a vertical king bolt 56 passing upwardly through the platform 10, and at the lower end of the king bolt is a bearing 57 having a horizontal shaft 58 at the outer ends of which are caster wheels 59, the king bolt being surmounted below the main frame by a sleeve 60 having an annular flange 61 at its upper end, and a bevel gear 62 at its lower end, the upper flange 61 having a bevel gear 63 and having its upper surface annularly grooved to oppose a similarly grooved surface in the platform 10 around the king bolt for the reception of antifriction balls 64. It will be noted from Fig. 3 in particular, that the shaft 58 is provided with a bevel gear 65 in engagement with the lower gear 62 of the sleeve 60, and that the upper bevel gear 63 is engaged by a gear 66 at the lower end of a driving shaft 67 inclined forwardly and upwardly, as seen in Fig. 2, and provided with a friction wheel 68 at its upper forward end, as best seen in Fig. 1.

The driven shaft 32, as before described, is connected by sprocket wheels and a sprocket chain 69, to the drive shaft 70 of the motor, generally indicated at 71 upon the platform 10, and upon which drive shaft 70 are splined a pair of friction disks 72 spaced apart and upon opposite sides of the friction wheel 68, these disks being shiftable to engage the friction wheel 68 for the purpose of transmitting rotation through the wheels of the shaft 67 to turn the steering caster, as seen in Fig. 3, it being apparent that this arrangement leaves the caster free for angular steering movement through suitable steering connections (not shown) in either direction dependent upon the direction it is desired that the apparatus proceed.

The friction disks 72 so disposed and normally free from contact with the friction wheel 68, are preferably shifted through certain connections including a yoke 73 engaging the same and located at the rear end of a rod 74 journaled below the platform 10, as is best seen by reference to Figs. 1 and 8, the rod 74 having a forward crank portion 75 as seen particularly in Fig. 8 connected by a connecting rod 76 to the depending arm 77 of a double tread 78, pressure upon the opposite ends of which results in shifting movement of the friction disks 77 in relatively opposite directions.

At the forward portion of the main frame a platform 10 is provided with a depending flange 79 having a pair of vertically disposed bearings 80, one adjacent each side of the frame, in which are adjustably held a pair of supporting uprights 81 each having a vertically projecting adjusting rod 82 extending upwardly beyond its upper ends and through a supporting bracket 83 secured to the forward portion of the main frame, the upper end of each of the adjusting rods 82 being threaded for engagement by a nut 84 bearing downwardly against the bracket 83 to hold the supporting posts 81 in various positions of vertical adjustment.

By reference to Fig. 2, it will be noted that the lower ends of the supporting uprights 81 are pivoted to the rear portions of a pair of forwardly projecting supporting arms 85, each of which is connected by a connecting rod 86 to the forward end of one of the end cranks 87 by a transverse adjusting shaft 88 mounted above the platform 10 parallel with the forward edge thereof, and carrying an adjusting lever 89 having a ratchet mechanism engaged with a notched quadrant 91. Thus by manipulation of the lever 89, the shaft 88 may be rotated and the supporting arms 85 raised and lowered as desired.

By reference again to Fig. 2, as well as to Fig. 1, it will be noted that the supporting arms 85 form effective supports for a reaper, mower or hay cutter, as well as for binding and like attachments.

Where a cutter, such as seen at 92 in Fig. 1, is utilized, it is preferably driven by a jointed shaft 96 in adjustable sections connected by a tubular coupling 97, the forward portion of which shaft is connected to the cutter and the rear end of which is provided with a bevel gear 98 in engagement with a bevel gear 99, of which it will be noted each of the cylindrical traction rollers 22 and 23 is provided at its outer end.

It is obvious from the foregoing that my invention is particularly desirable for propelling the various farm implements, either in the nature of harvesting implements or soil operating devices, and that it will, through its three point support, be particularly efficient in hilly country. It is furthermore obvious that by the steering engagement of the caster wheels, together with the independently controlled driving connections of the two forward traction cylinders, the direction of movement of the main frame may be readily and quickly controlled at all times, and its complete reversal effective within a minimum distance. For this purpose it is obvious one of the forward cylinders 22, 23 may be driven in one direction and the other in the opposite direction, dependent upon the direction it is desired to turn the main frame, the rear caster wheels being of course turned at the same time to conform therewith.

It should be stated, furthermore, that the connections 86 between the forward supporting arms 85 and the end cranks 87 of the adjusting shaft 88, are flexible so as to permit the beams 85 to yield in a vertical direction with the cutting mechanism or other implements carried thereby, due to inequalities in the ground.

I claim:—

1. In a power machine of the character described, the combination of a frame having forward transversely alined and laterally spaced cylindrical rollers, a motor, driving connections leading separately to said rollers and including reversible clutches, a rear steering caster having wheels, and manual means for separately controlling the said clutches, said frame having depending side guides adjacent its forward end and said forward rollers having spring controlled vertically adjustable journal boxes mounted in the said guides.

2. In a power machine of the character described, the combination of a frame having forward transversely alined and laterally spaced cylindrical rollers, a motor, driving connections leading separately to said rollers and including reversible clutches, a rear steering caster having wheels, manual means for separately controlling the said clutches, and manually controlled power actuating means for controlling the said steering caster. said frame including a platform having depending sides and an intermediate rib, and bearings for the said rollers having vertical yielding support in said sides and said rib.

3. In an apparatus of the character described, the combination of a power actuated frame having forward transversely alined and vertically yieldable cylindrical rollers forming traction members, each of said rollers being independently movable and having a gear wheel at the outer portion thereof projecting beyond the respective side of the frame, for the purpose described.

PATRICK POWERS.

Witnesses:
WILLIAM WHITE,
MELANCHTON EASTERDAY.